(12) United States Patent
Muñoz Fernandez et al.

(10) Patent No.: US 9,291,185 B2
(45) Date of Patent: Mar. 22, 2016

(54) DIRECT CONNECTION BETWEEN A TUBE AND A FLAT ELEMENT

(75) Inventors: Eduardo Muñoz Fernandez, Seville (ES); Maximiliano Carrasco Gimena, Seville (ES); José Ignacio Parra Fernández-Mota, Seville (ES); Luis Garrido Delgado, Seville (ES)

(73) Assignee: Europea De Construcciones Metalicas, S.A., Sevilla (ES)

( * ) Notice: Subject to any disclaimer, the term of this patent is extended or adjusted under 35 U.S.C. 154(b) by 0 days.

(21) Appl. No.: 13/880,722

(22) PCT Filed: Oct. 20, 2011

(86) PCT No.: PCT/ES2011/070723
§ 371 (c)(1),
(2), (4) Date: Jul. 6, 2013

(87) PCT Pub. No.: WO2012/052592
PCT Pub. Date: Apr. 26, 2012

(65) Prior Publication Data
US 2013/0287480 A1    Oct. 31, 2013

(30) Foreign Application Priority Data
Oct. 21, 2010   (ES) ................... 201001352

(51) Int. Cl.
*E04B 1/19*   (2006.01)
*F16B 17/00*  (2006.01)

(52) U.S. Cl.
CPC .............. *F16B 17/006* (2013.01); *E04B 1/19* (2013.01); *E04B 2001/193* (2013.01); *E04B 2001/1936* (2013.01); *Y10T 403/349* (2015.01); *Y10T 403/46* (2015.01); *Y10T 403/4634* (2015.01)

(58) Field of Classification Search
CPC ................. E04B 2001/1918; E04B 2001/193; E04B 2001/1936; E04B 1/19; E04C 3/04; E04C 2003/04; E04C 2003/0408; E04C 2003/0456; F16B 7/006
USPC .......... 403/169–178, 230, 242, 262; 52/653.2
See application file for complete search history.

(56) References Cited

U.S. PATENT DOCUMENTS 1,258,409 A * 3/1918 Hill ............................. 52/648.1
2,098,752 A * 11/1937 Miller .......................... 403/237
(Continued)

FOREIGN PATENT DOCUMENTS

AU   520837   3/1982
DE   822899   11/1951
(Continued)

OTHER PUBLICATIONS

Translation of EP 0 412 176 A1. Varotta, Alfio. Feb. 13, 1991.*
(Continued)

*Primary Examiner* — Josh Skroupa
(74) *Attorney, Agent, or Firm* — Kilpatrick Townsend & Stockton LLP

(57) ABSTRACT

Direct connection between a tube and a flat element by means of a connector preferably formed by stamping on the tube itself, which enables joining the latter to the flat element, without auxiliary elements, by nest-like insertion of same into the flat element and subsequent attachment by means of screws, rivets, bolts, pins or other elements.

15 Claims, 7 Drawing Sheets

(56) References Cited

U.S. PATENT DOCUMENTS

| | | | |
|---|---|---|---|
| 2,205,893 A | | 6/1940 | Unger |
| 2,982,572 A | * | 5/1961 | Farber ..................... 403/219 |
| 3,563,580 A | * | 2/1971 | Black ..................... 403/172 |
| 4,014,201 A | | 3/1977 | Troutner et al. |
| 4,162,860 A | * | 7/1979 | Mengeringhausen et al. .................... 403/199 |
| 4,340,318 A | * | 7/1982 | Frosch et al. ............ 403/217 |
| 4,577,449 A | * | 3/1986 | Celli ..................... 403/191 |
| 4,809,999 A | * | 3/1989 | Tozawa et al. ............ 403/274 |
| 4,902,159 A | | 2/1990 | Frantl et al. |
| 5,927,138 A | | 7/1999 | Richardson |
| 6,276,111 B1 | * | 8/2001 | Pittman et al. ............ 52/653.2 |
| 6,718,812 B1 | * | 4/2004 | Jaekel ..................... 72/325 |
| 6,752,451 B2 | * | 6/2004 | Sakamoto ............. B21C 1/22 29/897.2 |
| 6,758,022 B1 | * | 7/2004 | Coll et al. ..................... 52/690 |
| 6,814,184 B1 | * | 11/2004 | Blinn, Jr. ..................... 182/178.1 |
| 6,857,808 B1 | * | 2/2005 | Sugimoto et al. ............ 403/41 |
| 7,182,543 B2 | * | 2/2007 | Kondo et al. ............ 403/41 |
| 7,762,026 B2 | * | 7/2010 | Smelser ..................... 52/167.3 |
| 7,802,404 B2 | * | 9/2010 | Wolfram ..................... 52/81.3 |
| 8,615,960 B2 | * | 12/2013 | Marcotte et al. ............ 52/653.2 |
| 2010/0005752 A1 | | 1/2010 | Hawkins |

FOREIGN PATENT DOCUMENTS

| | | | | |
|---|---|---|---|---|
| DE | 3123482 A1 | * | 12/1982 | ............ E04B 1/58 |
| EP | 0412176 A1 | * | 5/1961 | ............ E04B 1/19 |
| EP | 225299 A2 | | 6/1987 | |
| EP | 0412176 A1 | | 2/1991 | |
| EP | 1522742 A1 | | 4/2005 | |
| ES | 1055767 U | | 1/2004 | |
| FR | 1579060 A | | 8/1969 | |
| FR | 2235243 A1 | * | 1/1975 | ............ E04B 1/00 |
| FR | 2826384 A1 | * | 12/2002 | ............ E04B 1/19 |
| GB | 2433268 A | | 6/2007 | |
| WO | 2008/039233 A2 | | 4/2008 | |
| WO | 2010/006193 A1 | | 1/2010 | |

OTHER PUBLICATIONS

PCT Search Report from PCT/ES2011/070723 dated Feb. 24, 2012 and its English translation.

PCT Written Opinion from PCT/ES2011/070723 dated Jan. 10, 2012 (untranslated).

PCT International Preliminary Report on Patentability Chapter II from PCT/ES2011/070723 dated Nov. 19, 2012 and its English translation.

Supplementary European Search Report mailed Jul. 10, 2014 for European Patent Application No. EP 2 631 378 A1, 7 pages.

* cited by examiner

DIRECT CONNECTION BETWEEN A TUBE AND A FLAT ELEMENT

CROSS-REFERENCE TO RELATED APPLICATIONS

This application is the national stage of International Patent Application no. PCT/ES2011/070723, filed on Oct. 20, 2011, which claims priority from Spanish patent application no. P201001352, filed on Oct. 21, 2010, the disclosures of which are incorporated herein in their entireties.

OBJECT OF THE INVENTION

Direct connection between a tube and a flat element.

BACKGROUND OF THE INVENTION

The present invention relates to a direct connection between a tube and a flat element, direct connection being understood as that connection which does not need auxiliary elements such as couplings, flanges, clamps, etc.

In general, the main function of the solution is the direct connection between a circular or square tube and a flat element such as a plate, sheet, gusset, etc.

Likewise, the invention is especially applicable to the construction of modular two-dimensional or three-dimensional tubular structures. These types of structures are constituted by a simple, double or even multi-layered latticework of tubular bars that are joined at intervals at common points or nodes.

The joining of two or three tubes is the simplest form of the connection node, however, nodes implying a larger number of tubes are quite common. In these cases, the tubular members can reach the node from different angles in different planes, or in a common plane. In the current state of the art, the joining of the tubes to the nodes is carried out by means of direct welding or by means of the installation of terminal elements at the ends of the tubes, allowing the connection to the nodes by means of welding or any other time of equivalent attachment, which supposes significant time and installation costs. Two connectors having spatial structures are known in patents WO2008/039233 A2 and WO 2010/006193 A1, which generate flat elements in the form of axial wings for the connection to the tubular bars configuring the structure, making the connection between them as described in WO 2010/006193 A1 by means of extruded connectors at the ends of the circular tubular bars. However, the type of connector used is only valid for circular bars, its shape also supposing a weak spot at the ends of the bars.

DESCRIPTION OF THE INVENTION

The direct connection between a tube and a flat element object of the present registry solves the aforementioned inconveniences and also contributes additional advantages that will be evident based on the description below.

The invention is based on the formation of a connector through the deformation, preferably by stamping, of the end or ends of a tube, thus configuring two star-shaped joining elements having two planes, preferably perpendicular, in such a way that slots are made at the ends of one of the planes for the correct reception of the flat element, until it is positioned inside the end of the tube.

In this same plane and perpendicularly thereof, as many drill holes are necessary are made for the attachment of the end of the tube to the flat element, this attachment being made by means of screws, rivets or other elements. Optionally, if the attachment procedure is made by welding, said drill holes would not be necessary.

Likewise and owing to the deformation itself, the ends of the plane, preferably perpendicular to the former, make up two central ribs whose purpose is to provide the deformed area of the tube with greater rigidity, in addition to providing a form of reinforcement to the resistance and stability of the joint.

Therefore, the connectors configured at the ends of the tubes allow the joining between them and the flat element, which takes place in a nest-like fashion, the attachment being made by means of screws, rivets, bolts, pins or other elements passing through the holes at the respective parts.

The resulting attachment is able to bear axial traction and compression loads, is economical and easy to manufacture and does not require the use of special elements.

As additional advantages, we have the following:

The eccentricities in stress transmission between the elements are avoided.

The screws, rivets, etc. work in double shear, increasing with it the resistance capacity of the joining.

Since it is an open-type configuration, it allows the internal galvanization of the tube.

In order to complete the description below and with the purpose of aiding a better comprehension of the direct connection between a tube and a flat element, a set of plans which figures represent the most significant details of the invention in an illustrative rather than limitative manner is attached to the present specification.

DESCRIPTION OF A PREFERRED EMBODIMENT

Figure 1:
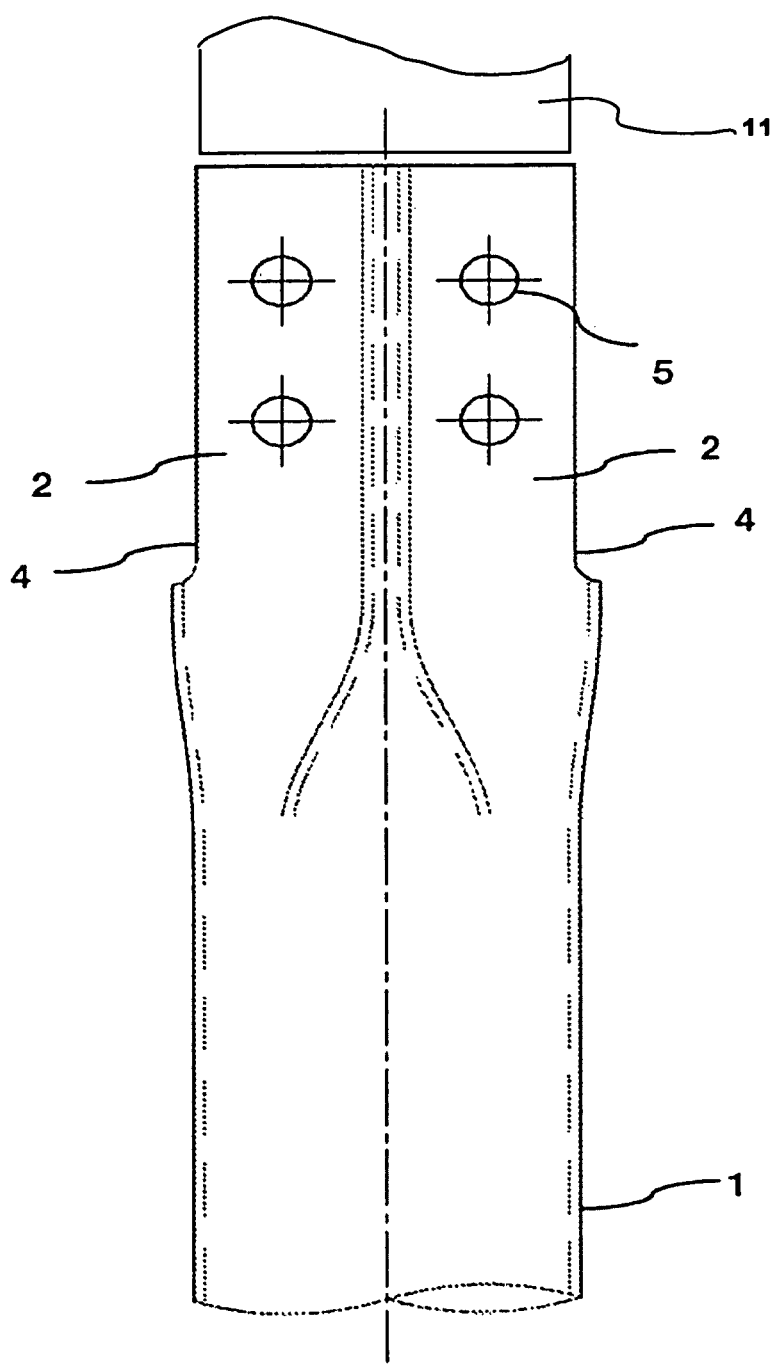
FIG. 1: a plant view of the direct connection, with four drill holes, between a circular tube and a flat element according to the present invention.
Figure 2:
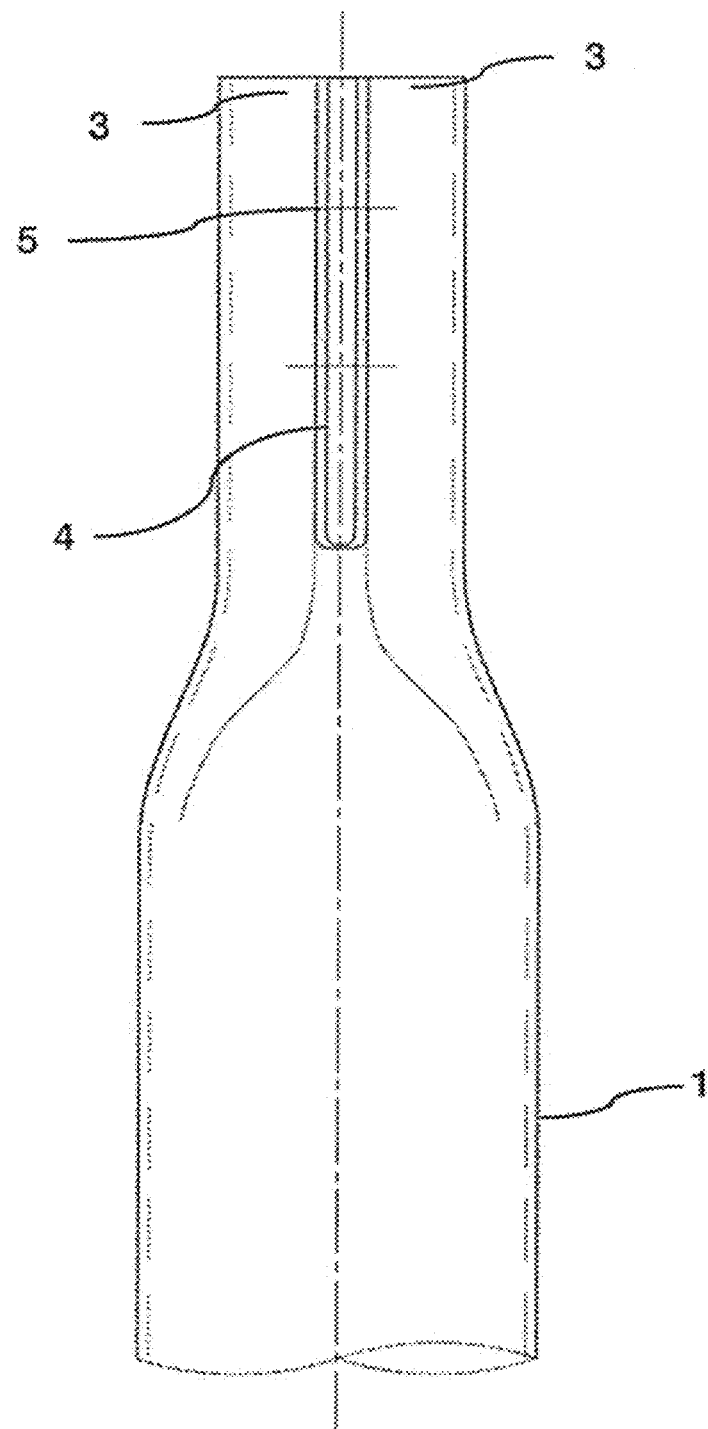
FIG. 2: represents a lateral view of FIG. 1.
Figure 3:
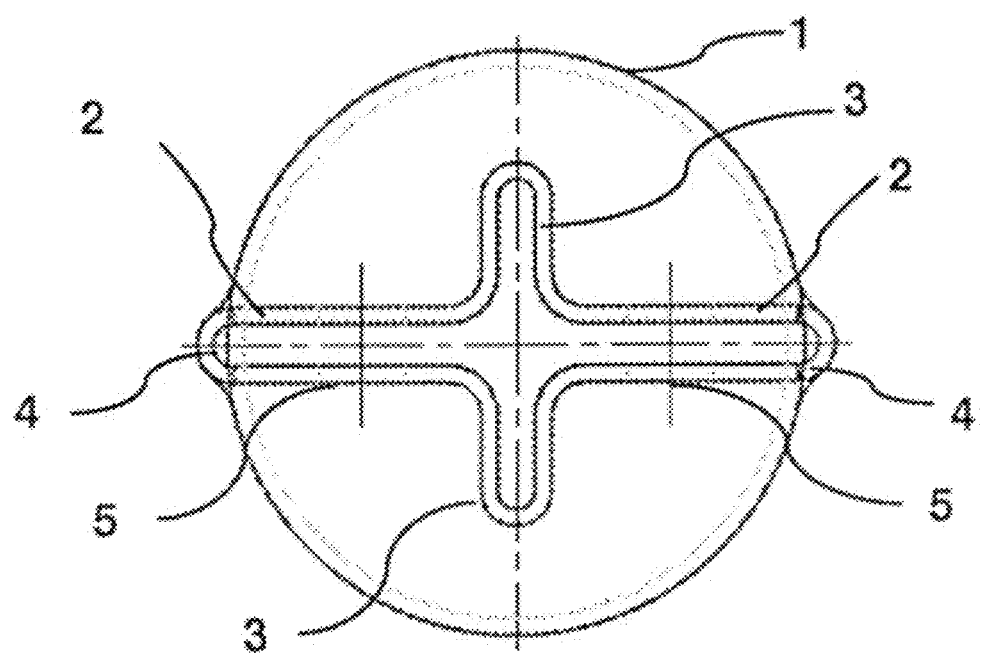
FIG. 3: shows a frontal view of the connection with four drill holes and a circular tube.
Figure 4:
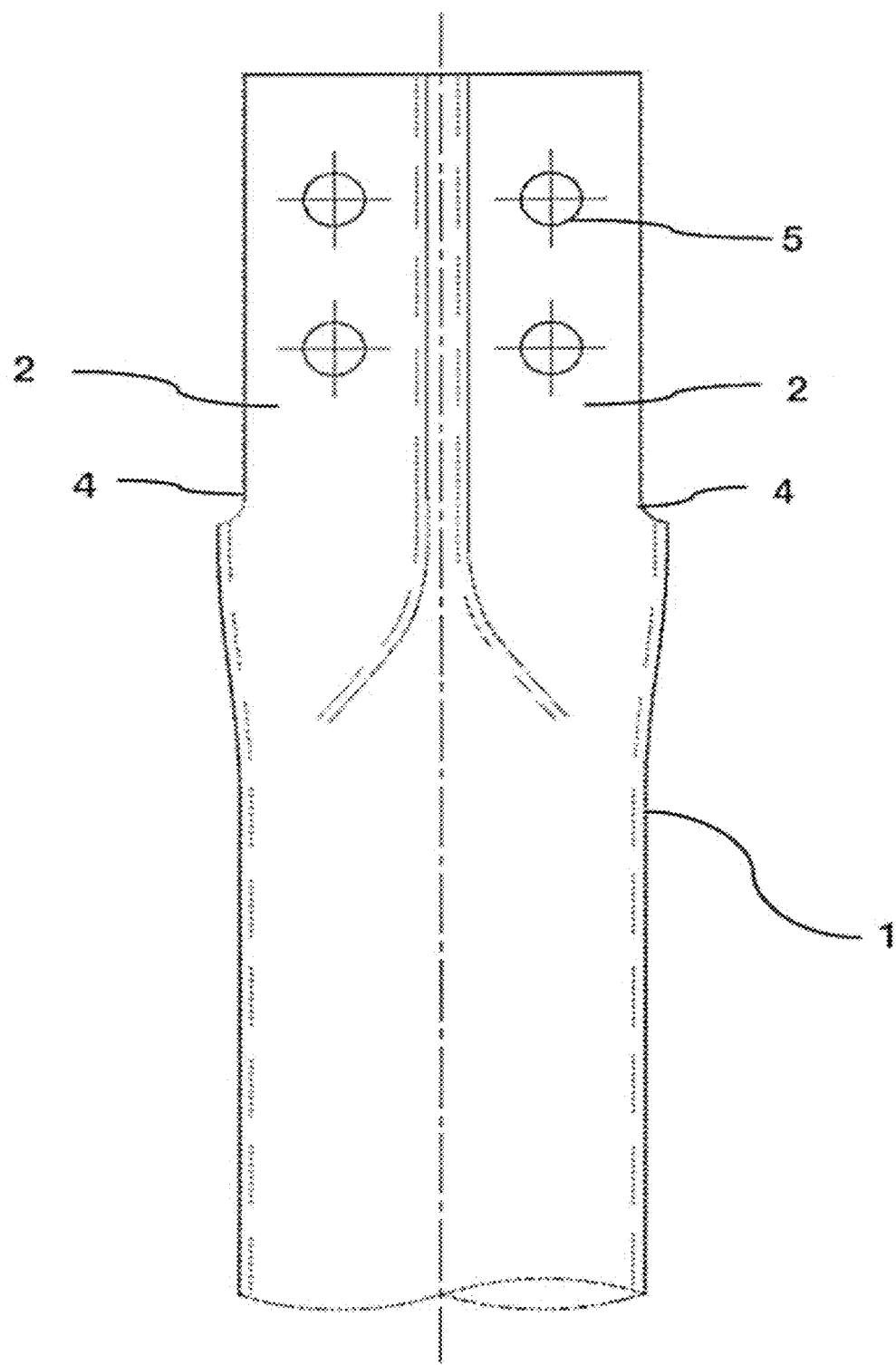
FIG. 4: shows a lateral view of the direct connection, with four drill holes, in the case of a square tube.
Figure 5:
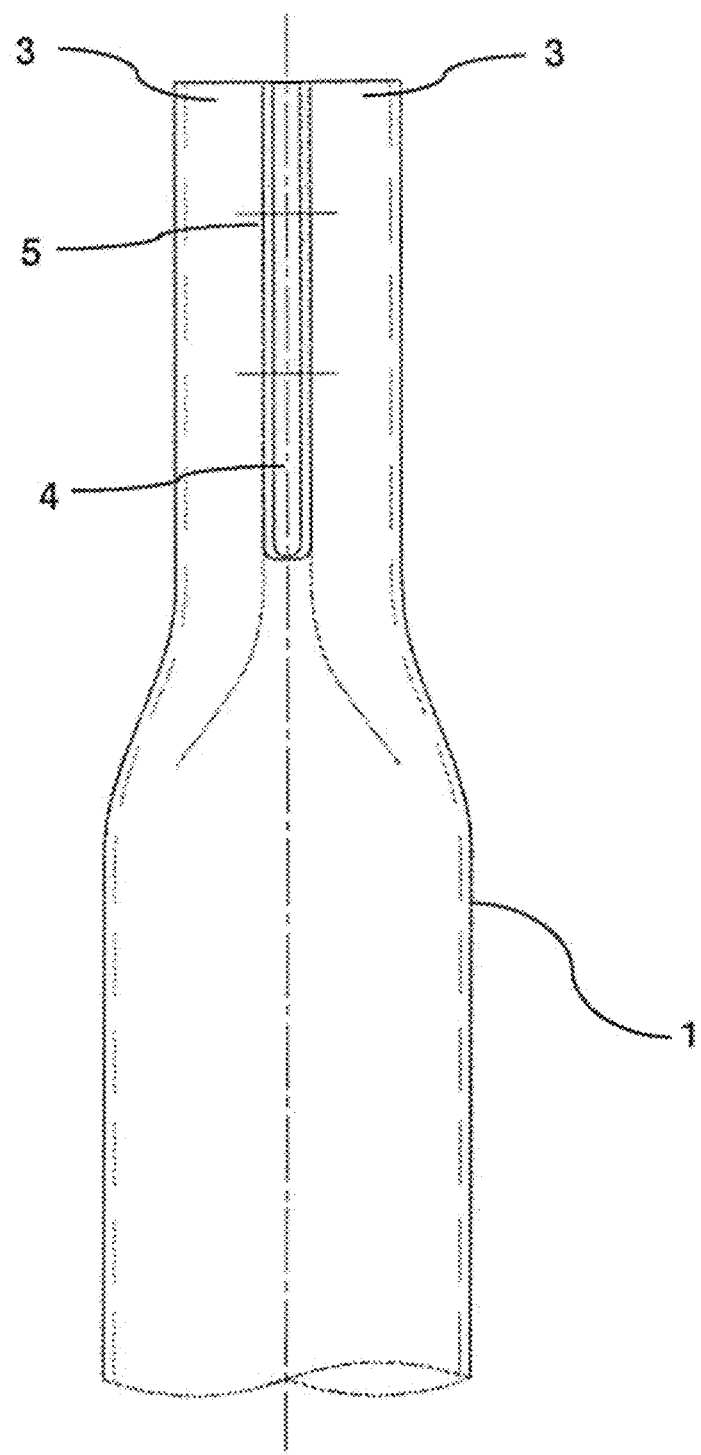
FIG. 5: shows a section of FIG. 4.
Figure 6:
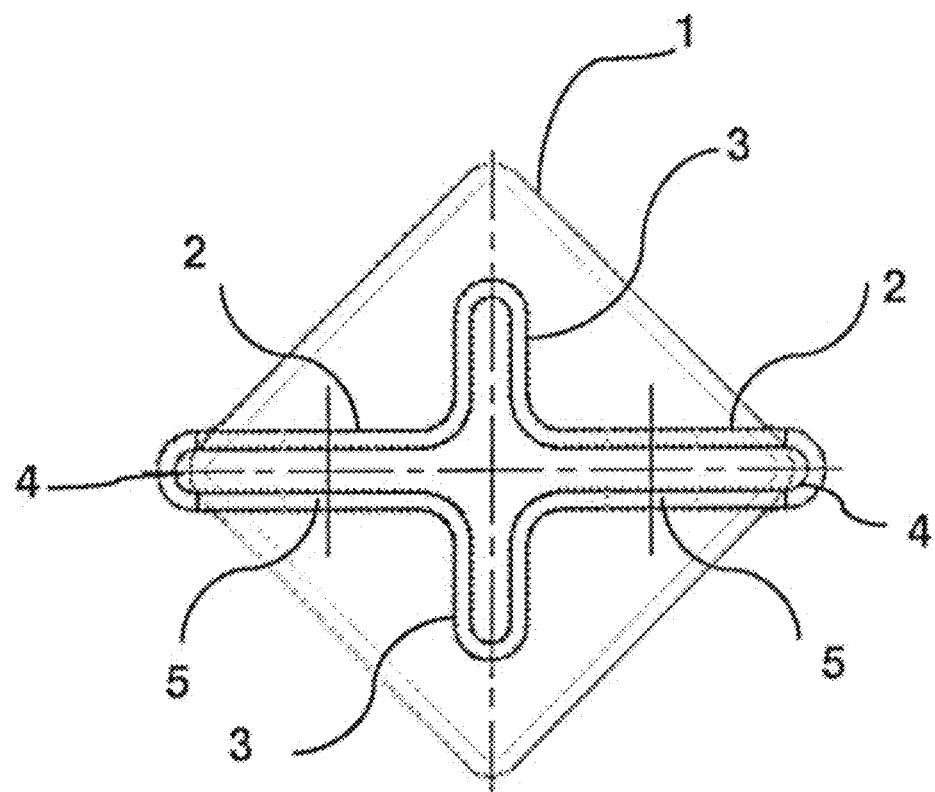
FIG. 6: shows a frontal view of the connection with four drill holes and a square tube.

In view of the aforementioned figures and according to the numeration adopted, a preferred, rather than limitative, embodiment of the invention is shown, which allows the construction of modular tubular structures, preferably to support parabolic trough solar collectors, consisting of the formation of a connector on a circular or square bar (1) through the deformation of one or both ends thereof, said connector configuring a star-shaped joining element, generating four semi-planes (2 and 3), preferably perpendicular, in such a way that slots (4) are made on the entire length of the resulting ends of the two large semi-planes (2) for the correct reception of the flat element, thus allowing the introduction of the same in their interior, the small semi-planes (3) configuring two central ribs which purpose is to provide the deformed area of the tube with greater rigidity, in addition to providing a form of reinforcement to the resistance and stability of the joint. In addition, preferably two or four drill holes (5) are made on the two large semi-planes resulting at both sides of the two small semi-planes in a perpendicular manner for the attachment of the end of the tube to the flat element (11), said attachment being made by means of screws, rivets or other through elements.

Figure 7:
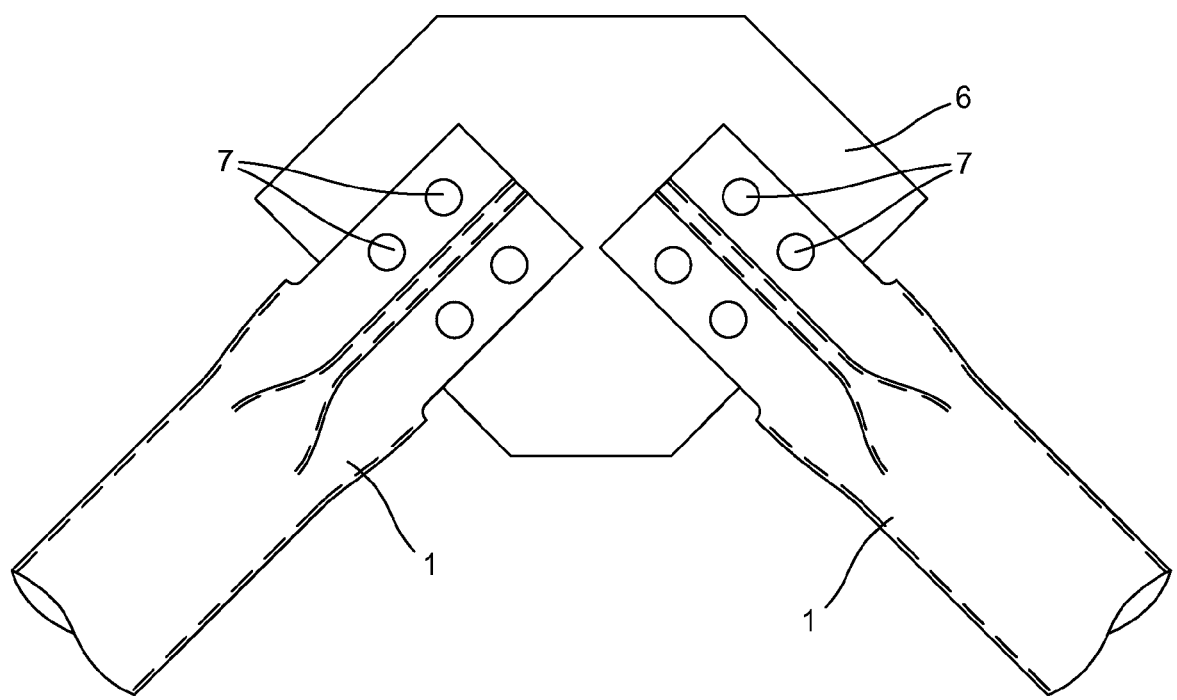
FIG. 7: shows a portion of a latticework of tubular bars joined at a node using direct connections as in FIG. 1.

FIG. 7 shows a portion of a latticework of tubular bars (1) joined at a node using direct connections as in FIG. 1. Bars (1) may be attached to a plate (6) using rivets (7) or other fasteners.

The details, shapes, dimensions and other accessory elements, as well as the materials used in the direct connection between a tube and a flat element object of the invention may be conveniently replaced with others that are technically equivalent and do not depart from the essential nature of the invention or from the scope defined by the claims included below.

The invention claimed is:

1. A directly connecting tube comprising a monolithic tube configured to receive and directly connect to a flat element, wherein an end of the tube is configured as comprising four hollow extensions in the form of semi-planes arranged as a star-shaped connector and each of the hollow extensions includes two substantially parallel walls, wherein the hollow extensions are deformations of the monolithic tube, and two of the hollow extensions are provided with open slots at their outer edges for reception of the flat element into the interior of the slots for direct connection to the flat element.

2. A directly connecting tube according to claim 1, wherein the star-shaped connector is a stamped star-shaped connector.

3. A directly connecting tube according to claim 2, wherein the star-shaped connector is a cross-shaped connector.

4. A directly connecting tube according to claim 3, wherein the cross-shaped connector has two of the hollow extensions, located in the same plane, larger than the two other hollow extensions, located in another plane.

5. A directly connecting tube according to claim 4, wherein the larger hollow extensions have a plurality of perpendicular drill holes configured for attachment to the flat element.

6. The directly connecting tube of claim 5, wherein the large hollow extensions have four drill holes.

7. The directly connecting tube of claim 5, wherein the large hollow extensions have two drill holes.

8. The directly connecting tube of claim 5, wherein the drill holes are configured for attachment to the flat element with screws, rivets or pins.

9. The directly connecting tube of claim 8, in combination with the flat element, wherein the tube and the flat element are attached using screws, rivets, or pins, and wherein the screws, rivets, or pins are in double shear.

10. A directly connecting tube according to claim 4, wherein the smaller hollow extensions are configured as two central ribs on the larger hollow extensions, providing improved mechanical strength to the larger hollow extensions.

11. A directly connecting tube according to claim 4, wherein the larger hollow extensions are provided with the slots at outer edges for reception of the flat element.

12. A directly connecting tube according to claim 1, wherein an internal surface is galvanized after the star-shaped connector is formed.

13. A modular two-dimensional or three-dimensional tubular structure comprising a single, double, or multi-layer latticework of tubular bars joined at intervals at common points or nodes, wherein the tubular bars comprise one or more directly connecting tubes of the kind recited in claim 1.

14. The directly connecting tube of claim 1, wherein the tube is a circular or square tube.

15. The directly connecting tube of claim 1, wherein the hollow extensions are formed by stamping.

* * * * *